United States Patent [19]
Winter et al.

[11] 3,963,585
[45] June 15, 1976

[54] DISTILLATION OF TITANIUM TETRACHLORIDE IN SOLUTION WITH SELECTED AMINES

[75] Inventors: Gerhard Winter, Krefeld; Walter Deissmann, Krefeld-Bockum; Walter Gutsche; Peter Woditsch, both of Krefeld, all of Germany

[73] Assignee: Bayer Aktiengesellschaft, Leverkusen, Germany

[22] Filed: May 1, 1974

[21] Appl. No.: 465,954

[30] Foreign Application Priority Data
May 22, 1973 Germany.............................. 2325924

[52] U.S. Cl.................................... 203/38; 203/59; 203/32; 423/67; 423/81; 423/264; 423/492; 260/429 R
[51] Int. Cl.²............................................ B01D 3/34
[58] Field of Search .................. 203/28, 32, 38, 50, 203/57, 59; 423/491, 492; 106/73.3; 260/429 R

[56] References Cited
FOREIGN PATENTS OR APPLICATIONS
262,267 9/1949 Switzerland......................... 423/492
265,393 3/1950 Switzerland......................... 423/492

OTHER PUBLICATIONS
Chem. Abstracts, vol. 42, 1948, pp. 2406g–2407b.

*Primary Examiner*—Norman Yudkoff
*Assistant Examiner*—Frank Sever
*Attorney, Agent, or Firm*—Burgess, Dinklage & Sprung

[57] ABSTRACT

In the purification of impure titanium tetrachloride comprising adding an agent to said titanium tetrachloride and thereafter distilling off purified titanium tetrachloride while leaving the impurity in the distillation residue, the improvement which comprises employing as said agent at least one amine of the formula

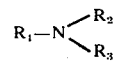

in which
$R_1$ and $R_2$ each independently is hydrogen, alkyl or alkenyl of up to 6 carbon atoms, cycloalkyl of 5 to 7 carbon atoms, or aryl, and
$R_3$ is cycloalkyl of 5 to 7 ring carbon atoms, or aryl, or
$R_2$ together with $R_3$ is butylene, pentylene or hexylene, in which event
$R_1$ is hydrogen, alkyl of up to 6 carbon atoms or aryl.

The preferred agents are aniline, cyclohexylamine, N,N-dimethyl-aniline, diphenylamine, 2,3-dimethylaniline and 2,6-dimethyl-aniline. The process serves to remove vanadium impurities.

6 Claims, 1 Drawing Figure

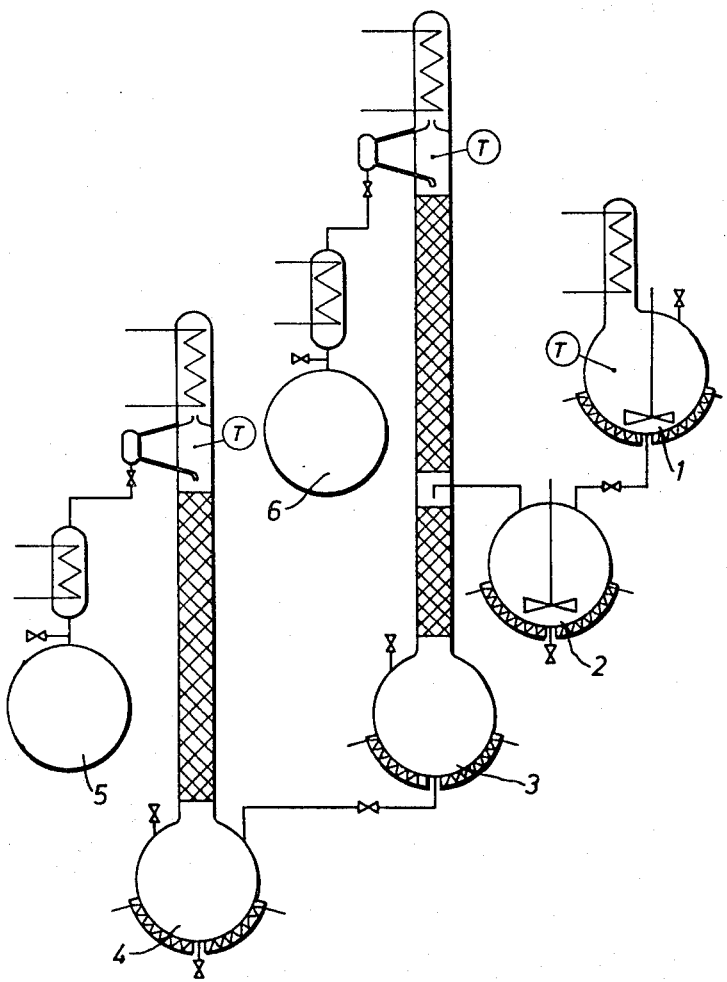

DISTILLATION OF TITANIUM TETRACHLORIDE IN SOLUTION WITH SELECTED AMINES

This invention relates to a process for the continuous or batch removal of vanadium compounds and other impurities from titanium tetrachloride, in which the $TiCl_4$ is heated in the presence of an organic compound which is able to react with vanadium chloride or vanadium oxychloride under normal pressure and at temperatures of up to 136°C. Amines have proved to be particularly effective in this respect. High reactivity is shown by amines which contain at least one optionally substituted cyclohexyl or phenyl radical.

Nowadays the so-called combustion process is also used for the production of white titanium dioxide pigments or optical oxides. In this process, $TiCl_4$ and oxygen are directly reacted at an elevated temperature to form titanium dioxide pigments. The $TiCl_4$ required for this reaction is obtained by the chloridizing decomposition of titanium-containing materials such as ilmenite, leucoxen or rutile, but unfortunately it is contaminated by a number of other chlorides (so-called crude $TiCl_4$). These other chlorides present in the $TiCl_4$ are predominantly the chlorides of iron, aluminum and silicon, also the chlorides and oxychlorides of vanadium.

It is absolutely essential to remove these impurities if pure white $TiO_2$ pigments are to be obtained. One method of purifying titanium tetrachloride is distillation. $TiCl_4$ boils at 136°C under normal pressure and, for this reason, can be separated by distillation from most of its impurities, such as iron, aluminum and silicon. In this way it is possible to obtain a product referred to hereinafter as "commercial-grade titanium tetrachloride". Vanadium is normally present in this commercial-grade $TiCl_4$ in the form of $VOCl_3$ (b.p. 127°C) or $VCl_4$ (b.p. 154°C). Due to their similar boiling points, both of these compounds are extremely difficult to separate from titanium tetrachloride by distillation.

A number of proposals have already been put forward with a view to simplifying the complicated distillation process, almost all of which comprise converting the vanadium into a low oxidation stage and subsequently separating the $TiCl_4$ by distillation. For example, it is known that purification can be carried out with $H_2S$ (German Offenlegungsschrift DOS No. 1,923,479); with animal and vegetable oils, fats, waxes, resins and soaps; with liquid, vapor or gaseous hydrocarbons, oils, fats, alcohols, ketones, organic acids, amines (Swiss Patent Specification No. 265,393 and No. 262,267; German Auslegeschrift DAS No. 1,289,839; No. 1,275,524 and No. 1,237,081; German Patent Specification No. 867,544, French Patent Specification No. 1,466,478 and No. 1,460,362), and with metals and metal salts (Belgian Patent Specification No. 539,078; German Offenlegungsschrift DOS No. 1,922,420; German Auslegeschrift DAS No. 1,271,693 and U.S. Pat. Nos. 2,915,364; 2,871,094; 2,754,255; 2,560,424; 2,555,361 and 2,530,735). Some idea of the necessary outlay involved can be derived from German Offenlegungsschrift DOS No. 2,135,250. In order to purify $TiCl_4$ having a vanadium content of 50 ppm, the $TiCl_4$ is boiled under reflux in the presence of benzene sulfenic acid dichloramide and metallic copper; The $TiCl_4$ which distills off still contains from 1 to 5 ppm of vanadium.

Additives which can readily be separated from the purified $TiCl_4$, either because they have a different boiling point or because they can be removed in the solid form together with the reduced vanadium compounds, are of particular advantage.

One particular elegant, although uneconomical, process comprises adding titanium subhalides such as $TiCl_3$. In cases where $TiCl_3$ is added, purified, colorless $TiCl_4$ can be distilled off after boiling for several hours (U.S. Pat. No. 2,178,685). Although the long reduction period for vanadium oxychloride is reduced by using $TiCl_3 \cdot 0.33\ AlCl_3$ in accordance with application Ser. No. 347,584, filed Apr. 2, 1973, now pending, the high price of the cocrystallizate $TiCl_3 \cdot 0.33\ AlCl_3$ prevents this from being used on an industrial scale.

It is accordingly an object of the present invention to provide a simple, inexpensive process for purifying titanium tetrachloride.

These and other objects are realized in accordance with the present invention which involves purification of impure titanium tetrachloride by adding an agent thereto followed by distilling off purified titanium tetrachloride while leaving the impurity in the distillation residue. In accordance with the invention the added agent is an amine of the formula

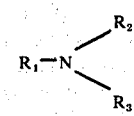

in which $R_1$ and $R_2$ each independently is hydrogen; aryl of 1 to 6 carbon atoms such as methyl, ethyl, isopropyl and hexyl; alkenyl of up to 6 carbon atoms such as vinyl and propenyl; cycloalkyl of 5 to 7 ring carbon atoms such as cyclohexyl; or aryl such as phenyl;

$R_3$ is cycloalkyl of 5 to 7 ring carbon atoms such as cyclohexyl, or aryl such as phenyl, or together with the radical $R_2$ is butylene, pentylene or hexylene forming with the nitrogen atom a 5- to 7-membered heterocyclic ring in which event $R_1$ is hydrogen, alkyl of 1 to 6 carbon atoms such as methyl, ethyl, and isopropyl, or aryl such as phenyl; cyclohexyl and aryl radicals may optionally contain one or more other substituents, namely alkyl of 1 to 6 carbon atoms, for example methyl or ethyl, halogen, for example Cl or Br, amino groups, for example $-NH_2$ or $-N(CH_3)_2$, hydroxyalkyl groups, for example hydroxymethyl, and the like.

Examples of compounds such as these include aniline, cyclohexylamine, N,N-dimethyl-aniline, diphenylamine, 2,3-dimethyl-aniline, 2,6-dimethyl-aniline, pyrrolidine and piperidine. It is particularly preferred to use aniline and/or piperidine.

These amines react rapidly with the vanadium chloride or oxychloride at a temperature from room temperature up to the boiling point of the titanium tetrachloride, e.g. about 25° to 136°C, preferably at a temperature of about 60° to 100°C, and for this reason they enable the titanium tetrachloride to be continuously purified. Although it is preferred to purify commercial-grade $TiCl_4$ in accordance with the invention, it is also possible to purify $TiCl_4$ which contains other impurities in addition to the vanadium chloride. Iron and aluminum chlorides, $SiCl_4$, $ZrCl_4$ or other chlorides are harmless. Although the presence of elemental chlorine results in a corresponding increase in the comsumption of the reduction component, it does allow the advantage of having no dechlorination stage. The amines used in accordance with the invention are so inexpensive that a somewhat higher demand due to the presence of $Cl_2$ can be readily accepted and this demand does not have any adverse effect upon the economy of the process according to the invention.

Nowadays titanium tetrachloride in its crystal-clear form is a prized starting product for a number of applications. Particular importance is attached to a crystal-clear light-stable $TiCl_4$. Hitherto the production of a light-stable titanium tetrachloride has involved a special purification stage. Following addition of the compounds according to the invention, for example diphenylamine, a crystal-clear light-stable $TiCl_4$ can be continuously obtained from the crude product which is obtained during the chlorination of $TiO_2$ without any need for additional purification stages.

The purification process according to the invention can be carried out continuously or in batches, by adding a corresponding amine to the $TiCl_4$ to form a vanadium-free $TiCl_4$ after heating and distillation.

In cases where the process according to the invention is carried out continuously, crude $TiCl_4$ in the form in which it accumulates following separation of most of the solid impurities (for example $FeCl_3$) and an amine, optionally suspended or dissolved in crude $TiCl_4$, are introduced into a distillation flask. During distillation the reduced vanadium compounds and the oxidized amine are enriched in the distillation flask until the residue has a solids content of about 10 to 40 % by weight. The residue is discharged continuously or in batches and concentrated by evaporation. About 50 % of the $TiCl_4$ which distills can be added to the puified distillate. The remainder is returned to the crude $TiCl_4$ and the solids recovered as the residue. This residue contains vanadium in enriched form and, for this reason, can be used for the production of vanadium compounds. Another considerable advantage of the process according to the invention is in the wide dosage range of the active amines which are used as reducing agent.

The quantities required for the reduction are between about 0.1 and 5 moles of amine, based on vanadium, or to between about 0.1 and 10% by weight of amine, based on crude $TiCl_4$, depending upon the vanadium content. The amine is preferably used in a quantity of about 0.2 to 1.5% by weight. If a sufficient quantity of reducing agent is added, reduction of the $VOCl_3$ begins instantaneously at temperatures above 60° to 80°C in the case of most amines, and a colorless or lightly coloured distillate having a vanadium content of less than 10 ppm, generally less than 1 ppm of vanadium, is obtained.

The invention will be further described in the accompanying drawing wherein the single FIGURE is a schematic view of an apparatus for carrying out the process.

Referring now more particularly to the drawing, crude $TiCl_4$ is heated to 60°C in a three-necked flask 1 equipped with a stirrer and an additional outlet in its base. Diphenylamine, used as reducing agent, is added. The mixture is run continuously into an indirectly heated three-necked flask 2 equipped with a stirrer and bottom outlet acting as an evaporator. The temperature of this flask 2 is kept at 136°C so that pure $TiCl_4$ distills off continuously. When the solids have been concentrated to around 20% in the flask 2, 10% of the suspension is removed, the $TiCl_4$ distilled off, added to the crude $TiCl_4$ and the residue discharged. From this crude $TiCl_4$ circuit, the vanadium-free $TiCl_4$ distilling off is continuously introduced at the center of a first column, the readily volatile constituents accumulating in the head of the column 6. The sump 3 of this first column consists of vanadium-free $TiCl_4$ which progressively turns very slightly yellow in color when diphenylamine is used as the reducing agent. The $TiCl_4$ flows from the sump of the column 3 into another indirectly heated flask 4 through an overflow from which it is continuously distilled through a column filled with Raschig rings into a receiver 5.

The process according to the invention is illustrated by the following Examples.

EXAMPLE 1

100 g of crude titanium tetrachloride with a vanadium content of 680 ppm were introduced into a glass flask, and 1 g of aniline acting as the reducing agent was added. After brief shaking, the mixture was heated and the titanium tetrachloride immediately distilled off, without using a volumn except for a residue of about 20 %. After heating for about 3 to 5 minutes, and distillation for about 8 to 10 minutes, the distillate was tested for vanadium. The vanadium content was less than 1 ppm.

EXAMPLE 2

The suitability of a number of other amines for reducing $VOCl_3$ were tested as in Example 1. The quantities of vanadium found in the distillate are shown in the following Table which also shows the substances used. The starting material was once again a crude $TiCl_4$ containing 680 ppm of vanadium.

| Compound added 1 g per 100 g of crude $TiCl_4$ | Vanadium content of distillate (ppm) |
|---|---|
| Piperidine | 3 |
| 2,3-dimethyl aniline | 2 |
| Cyclohexylamine | 4 |
| N,N-dimethyl aniline | 25 |
| 2,6-dimethyl aniline | 54 |

A rapid reaction occurred with these compounds, recognizable both from the formation of a discolored residue and from the reduced vanadium content of the distillate. By virtue of the fast reaction, the corresponding compounds are particularly suitable for removing vanadium from $TiCl_4$.

EXAMPLE 3

A $TiCl_4$ of the kind which accumulates during the chlorination of rutile in the presence of carbon, having a solids content of 1.6% by weight and a vanadium content of 850 ppm, was introduced into a spherical flask equipped with a stirrer, column (30 cm) and dephlegmator, and 1% by weight of diphenyl amine was added. After heating to the boiling point, $TiCl_4$ was directly distilled off in colorless form. The vanadium content was analyzed and was less than 1 ppm. The distillate was colorless and did not show any signs of discoloration after a second distillation followed by 36 hours exposure to utlra violet light.

EXAMPLE 4

2 kg of a commercial-grade crude TiCl$_4$ obtained by chlorinating rutile, having a solids content of 1.6% by weight (1.1 % by weight of carbon, 0.5 % by weight of ash), an FeCl$_3$ content of 0.4 % by weight, an AlCl$_3$ content of 0.1 % by weight, an MgCl$_2$ content of 0.01 % by weight and a vanadium content of 850 ppm, were introduced into a distillation flask, followed by the addition of 20 g of 2,6-dimethyl aniline. After heating to the boiling point over a period of about 10 minutes, a pale yellow-colored distillate containing less than 2 ppm of vanadium was directly obtained. After a further distillation, the distillate was colorless and could be used for the production of TiO$_2$.

EXAMPLE 5

2 kg of commercial-grade crude TiCl$_4$ containing 680 ppm of vanadium were introduced into a spherical flask equipped with a dropping funnel, stirrer, column and dephlegmator, and 20 g of diphenylamine were added. Heating to the boiling point produced a reaction accompanied by the formation of a black deposit. The distillate was almost colorless and contained less than 1 ppm of vanadium. Crude TiCl$_4$ was introduced through the dropping funnel while distillation was still in progress. The distillate remained almost vanadium-free until about 0.6 % by weight of diphenylamine had been consumed. Thereafter vanadium began to distil off. Accordingly, the diphenylamine requirement amounted to 1 mole for 3 moles of vanadium.

EXAMPLE 6

Crude TiCl$_4$ containing 680 ppm of vanadium was introduced into a spherical flask equipped with a stirrer, dropping funnel and dephlegmator, 1% by weight of aniline was added and the mixture was heated to its boiling point. More vanadium-containing crude TiCl$_4$ mixed with the corresponding quantity of aniline was added as distillation began. The impure commercial-grade TiCl$_4$ was added at a rate commensurate with that at which vanadium-free distillate was run off. Inspite of the unfavorable residence time spectrum, it was possible to obtain vanadium-free TiCl$_4$ either pale blue or yellow in color. A crystal-clear titanium tetrachloride which contained less than 1 ppm of vanadium was obtained after a second distillation.

EXAMPLE 7

The commercial-grade crude TiCl$_4$ described in Example 4 was continuously purified using the apparatur as described hereinabove. The TiCl$_4$ formed was crystal clear, colorless and light-stable. Exposure to ultra violet light for more than 36 hours did not produce any discoloration.

The installation described above was operated continuously for 36 hours, producing 80 kg of pure TiCl$_4$ with a vanadium content of less than 1 ppm (detection limit of the analytical method used).

On the completion of the test, less than 0.02% of residue, based on the throughput, was isolated from the sump 3 of the distillation flask 4. In permanent operation, this residue would have had to be delivered to the flask 2 in the form of a recycle stream of the order of 1 to 2 % of the TiCl$_4$ throughput. By varying the quantity of diphenylamine added to the TiCl$_4$, it was possible to detect 0.5 g diphenylamine per kg of TiCl$_4$ as the lower limit with 850 ppm of vanadium. If this lower limit was exceeded, the TiCl$_4$ in the flask 4 turned yellow in color while the end product in the flask 5 turned yellow in color due to the VOCl$_3$. An excess of diphenylamine did not have any adverse effects.

EXAMPLE 8

The installation described in Example 7 was operated for 14 hours using aniline as the reducing agent for VOCl$_3$. A crystal-clear colorless titanium tetrachloride of high light stability was formed with an addition of 1 g of aniline per kg of crude TiCl$_4$ (corresponding to Example 7). An excess of aniline was reflected by slight discoloration in the flasks 3 and 4, and a larger residue in the flask 4, and hence requires a larger recycle stream from 4 to 1 or 2.

If the addition of aniline is reduced to less than 0.6 g per kg of TiCl$_4$, vanadium breaks through, its presence being reflected in the yellowish color of the distillate in the flask 5.

It will be appreciated that the instant specification and examples are set forth by way of illustration and not limitation and that various modifications and changes may be made without departing from the spirit and scope of the present invention.

What is claimed is:

1. In the purification of impure vanadium-containing titanium tetrachloride comprising adding an agent to said titanium tetrachloride to react with the vanadium impurity and thereafter removing purified titanium tetrachloride as distillate while leaving the vanadium impurity-agent reaction product in the distillation residue, the improvement which comprises employing as said agent an amine of the formula

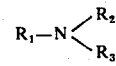

in which
R$_1$ and R$_2$ each independently is selected from the group consisting of hydrogen, alkyl of up to 6 carbon atoms, alkenyl of up to 6 carbon atoms, cycloalkyl of 5 to 7 carbon atoms, and aryl, and
R$_3$ is selected from the group consisting of cycloalkyl of 5 to 7 ring carbon atoms, and aryl.

2. In the purification of impure vanadium-containing titanium tetrachloride comprising adding an agent to said titanium tetrachloride to react with the vanadium impurity and thereafter removing purified titanium tetrachloride as distillate while leaving the vanadium impurity-agent reaction product in the distillation residue, the improvement which comprises employing as said agent at least one material selected from the group consisting of pyrrolidine and piperidine.

3. The process of claim 1, wherein R$_3$ is selected from the group consisting of cyclohexyl and phenyl.

4. The process of claim 3, wherein said agent is at least one material selected from the group consisting of cyclohexylamine, aniline, N,N-dimethyl-aniline, diphenylamine, 2,3-dimethyl-aniline and 2,6-dimethylaniline.

5. The process of claim 1, wherein said agent is added in about 0.1 to 10% by weight of the impure titanium tetrachloride.

6. The process of claim 1, wherein the impure titanium tetrachloride contains vanadium as an impurity and said agent is added within about 0.2 to 1.5% by weight of the impure titanium tetrachloride in about 0.1 to 5 times the molar amount of vanadium.

* * * * *